(12) United States Patent
Ito (10) Patent No.: US 8,838,355 B2
(45) Date of Patent: Sep. 16, 2014

(54) BRAKING DEVICE AND BRAKING METHOD

(75) Inventor: Yuki Ito, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 98 days.

(21) Appl. No.: 13/520,815

(22) PCT Filed: Jan. 6, 2011

(86) PCT No.: PCT/JP2011/050118
§ 371 (c)(1),
(2), (4) Date: Jul. 6, 2012

(87) PCT Pub. No.: WO2011/083821
PCT Pub. Date: Jul. 14, 2011

(65) Prior Publication Data
US 2012/0283926 A1    Nov. 8, 2012

(30) Foreign Application Priority Data

Jan. 8, 2010  (JP) .................................. 2010-003271

(51) Int. Cl.
*B60T 8/17*       (2006.01)
*B60L 7/24*       (2006.01)
*B60T 17/22*      (2006.01)
*B60T 8/88*       (2006.01)
*B60T 8/40*       (2006.01)
*B60L 3/00*       (2006.01)
*B60T 8/90*       (2006.01)

(52) U.S. Cl.
CPC ............. *B60T 8/885* (2013.01); *B60T 8/4018* (2013.01); *B60T 8/4081* (2013.01); *B60T 2270/406* (2013.01); *B60L 3/0038* (2013.01); *B60L 3/0076* (2013.01); *B60T 8/90* (2013.01)
USPC .............................................. 701/70; 701/73

(58) Field of Classification Search
CPC .............. B60L 3/0038; B60L 3/0076; B60T 2270/406; B60T 8/4018; B60T 8/4081; B60T 8/885; B60T 8/90

USPC ..................................................... 701/70, 73
See application file for complete search history.

(56) References Cited

U.S. PATENT DOCUMENTS 6,450,591 B1   9/2002  Kawahata et al.
7,651,176 B2   1/2010  Inoue et al.

FOREIGN PATENT DOCUMENTS

JP    4-243658 A    8/1992
JP   11-059389 A    3/1999

(Continued)

OTHER PUBLICATIONS

JPO machine translation of JP 2007-112160 A and JP 11-059389 A.*

*Primary Examiner* — Fadey Jabr
*Assistant Examiner* — Yazan A Soofi
(74) *Attorney, Agent, or Firm* — Carrier Blackman & Associates, P.C.; Joseph P. Carrier; William D. Blackman (57) ABSTRACT

An operation quantity detector detects an operation quantity. Hydraulic passage systems provide connection between hydraulic chambers of a tandem type master cylinder and wheel cylinders. A hydraulic pressure source in the hydraulic passages can pressurize the hydraulic passages based on the operation quantity. Cutoff valves each is installed in each of the hydraulic passages, between the master cylinder and the hydraulic pressure source. The hydraulic pressure detectors detect hydraulic pressures of the hydraulic passages. In the opening command state, a first mutual diagnosis based on the hydraulic pressures and the operation quantity and a second mutual diagnosis based on the hydraulic pressures are performed. In the closing command state, the first and second mutual diagnoses are performed. A failure is detected in the cutoff valves and the hydraulic pressure detecting units based on results of the first and second mutual diagnoses in the opening closing command states.

13 Claims, 7 Drawing Sheets

(56) References Cited

FOREIGN PATENT DOCUMENTS

| JP | 11059389 A | * | 3/1999 |
| JP | 2007-112160 A | | 5/2007 |
| JP | 2007112160 A | * | 5/2007 |
| JP | 2008-143419 A | | 6/2008 |

* cited by examiner

11: Brake control unit  12: State determining unit  14: First alarming unit
13: Braking force allocating unit  15: Second alarming unit

(a) A1. Pedal stroke-P2 sensor mutual diagnosis during MCV opening command (c) A2. Pedal stroke-P2 sensor mutual diagnosis during MCV closing command MCV open seizing: ((A1=OK) || (B1= OK&&(A2=NG) || (B2=NG))

(b) B1. Mutual diagnosis between P sensors during MCV opening command (d) B2. Mutual diagnosis between P sensors during MCV closing command

FIG. 7

MCV close seizing: ((A1=NG) || (B1= NG)&&(A2=OK) || (B2=OK))

(a) A1. Pedal stroke–P2 sensor mutual diagnosis during MCV opening command

(c) A2. Pedal stroke–P2 sensor mutual diagnosis during MCV closing command (b) B1. Mutual diagnosis between P sensors during MCV opening command (d) B2. Mutual diagnosis between P sensors during MCV closing command

BRAKING DEVICE AND BRAKING METHOD

TECHNICAL FIELD

The present invention relates to a braking device including a plurality of systems of hydraulic passages between a tandem type of master cylinder and a plurality of wheel cylinders.

BACKGROUND ART

The tandem type of master cylinder has a plurality of hydraulic chambers which are connected to a plurality of wheel cylinders with a plurality of systems of hydraulic passages. When a driver operates a brake pedal, a hydraulic pressure is generated in a plurality of the hydraulic chambers. The hydraulic pressure is cut off not to directly operate a plurality of the wheel cylinders, but hydraulic pressures are generated in a plurality of hydraulic chambers in consideration of other physical quantities in addition to the operation quantity of the brake pedal, in order to operate a plurality of wheel cylinders. Such a braking system is so called brake-by-wire (BBW), and a braking device for this braking system has been proposed (for example, see patent document 1).

PRIOR ART

Patent Documents

[Patent Document 1] JP 2008-143419

DISCLOSURE OF THE INVENTION

Summary of Invention

Problem to be Solved by Invention

In the conventional braking device, a hydraulic pressure detecting unit is provided to detect a hydraulic pressure in each of a plurality of systems of hydraulic passages for failure diagnosis. In addition, a cutoff valve is installed in each of a plurality of systems of hydraulic passages to cut off a hydraulic pressure generated in a master cylinder to wheel cylinders. Accordingly, in each of a plurality of systems of hydraulic passages, a hydraulic pressure detecting unit and a cutoff valve are installed. Here, when the hydraulic pressure detecting unit detects abnormality in a hydraulic pressure, the braking control unit in the braking device can diagnose occurrence of a failure. However, a source of the failure cannot be determined as to whether the failure is in the hydraulic pressure detecting unit or the cutoff valve.

If it can be determined that the failure is in the hydraulic pressure detecting unit, a suitable braking control can be provided in accordance with the failure in the hydraulic pressure detecting unit. If it can be determined that the failure is in the cutoff valve, a suitable braking control can be provided in accordance with the failure in the cutoff valve.

The present invention aims to provide a braking device and a braking method capable of specifying an occurrence source of the failure.

The present invention provides a braking device comprising:

an operation quantity detecting unit for detecting an operation quantity of a brake pedal;

a plurality of systems of hydraulic passages connecting a plurality of hydraulic chambers of a tandem type master cylinder capable of generating hydraulic pressures by an operation of the brake pedal by a driver to a plurality of wheel cylinders;

a hydraulic pressure source installed in the hydraulic passages and being capable of pressurizing a hydraulic pressure in the hydraulic passages on the basis of the operation quantity detected by the operation quantity detecting unit;

cutoff valves each installed in each of the hydraulic passages, between the master cylinder and the hydraulic pressure source, and being closed in a closing command state or being opened in an opening command state;

a plurality of hydraulic pressure detecting units each for detecting a hydraulic pressure of each of the hydraulic passages on a side of the wheel cylinders with respect to the cutoff valves, wherein:

in the opening command state, a first mutual diagnosis on the basis of the hydraulic pressures detected by the hydraulic pressure detecting unit and an operation quantity detected by the operation quantity detecting unit and a second mutual diagnosis based on the hydraulic pressures detected by a plurality of the hydraulic pressure detecting units are performed, in the closing command state, the first and second mutual diagnoses are performed, and failure in the cutoff valves and a plurality of the hydraulic pressure detecting units is detected on the basis of results of the first and second mutual diagnoses in the closing command state and the opening command state According to this, because the first and second mutual diagnoses are performed in the opening command state and the closing command state, a difference in the first mutual diagnosis in the opening command state and the closing command state of the cutoff valve and the difference in the second mutual diagnosis between the closing command state and the closing command state of the cutoff valve can be detected. When these differences are to be developed between opening and closing of the cutoff valve, but when no difference occurs between the opening command state and the closing command state, failure in the cutoff valve can be detected. In addition when the result of the first mutual diagnosis is abnormal both in the opening command state and closing command state, and when the result of the second mutual diagnosis is abnormal both in the opening command state and the closing command state, failure in the hydraulic pressure detecting unit can be detected. As described above, a failure occurrence source can be specified on the basis of the result of the first and second mutual diagnoses in the opening command state and the closing command state.

In addition, in the first mutual diagnosis, a stroke-pressure characteristic in a normal state between the operation quantity of the brake pedal and the hydraulic pressure detected by the hydraulic pressure detecting unit in an open state in which the cutoff valve is actually open in accordance with the opening command state of the cutoff valve and in a close state in which the cutoff valve is actually close in accordance with the close command state, is previously stored in the brake control unit, which provides a diagnosis between normal and abnormal on the basis of the stroke-pressure characteristic in a normal state with a smaller number of sensors. Likewise, in the second mutual diagnosis, a pressure-pressure characteristic in a normal state between a plurality of the hydraulic pressures detected by a plurality of the hydraulic pressure detecting units in the open state in which the cutoff valve is actually open in accordance with the opening command state of the cutoff valve and in the close state in which the cutoff valve is actually close in accordance with the close command state, is previously stored in the brake control unit, which provides a diagnosis between normal and abnormal on the basis of the pressure-pressure characteristic in a normal state with a small number of sensors.

In this invention, when a result of either of the first or second mutual diagnoses in the opening command state and the closing command state is abnormal and the other one of the result is normal, it is preferable that the cutoff valve is determined as having failed, and general braking force adjusting control of the wheel cylinders is performed with the hydraulic pressure source.

According to this, if there were abnormalities in both the first and second mutual diagnoses, the hydraulic pressure detecting unit may determine this as failure. However, because there is abnormality in one of the first and second mutual diagnoses, it is supposed that a failure occurs in a portion other than the hydraulic pressure detecting unit. Accordingly, it is determined that the failure occurs in the cutoff valve. When the cutoff valve is failed, there may be a case where the hydraulic pressure cannot be cut off. However, because it is also possible to cut off the hydraulic pressure generated when the hydraulic pressure source generates a hydraulic pressure, a general braking force control for the wheel cylinders by the hydraulic pressure source can be performed, so that such a characteristic of the product in having a resistivity against failure can be enhanced. As described above, even if a failure occurs, the braking force control can be performed with the hydraulic pressure source, so that a controllable range can be expanded. Accordingly, a servo drive or braking force adjusting control provided as braking force control can be used even in a case of failure, which enhances the product characteristic such that there is a high resistivity against a failure.

In the present invention, it is preferred that which one of a plurality of the systems to which a failed one of the cutoff valves and the hydraulic pressure detecting unit belongs on the basis of the first and second mutual diagnoses in the opening command state and the closing command state.

According to this, specifying which system has a failure provides determination of a specific failure part.

In the present invention, a braking force allocating unit for controlling allocation of a braking force to a regeneration braking by a motor capable of driving a first axle and braking of the first axle by the hydraulic pressure source is provided. The hydraulic passages of a plurality of the systems comprise a first hydraulic system for braking the first axle and a second hydraulic system for braking an axle other than the first axle. It is preferred that: the braking force allocating unit maintains a braking force allocation ratio, which is a ratio of braking by the hydraulic pressure source to the regeneration braking, at a normal ratio when a failure is detected in the cutoff valve and the hydraulic pressure detecting unit of the second hydraulic system.

This prevents an energy collection performance by regeneration in a motor from decreasing.

In addition, in the present invention, a braking force allocating unit for controlling allocation of a braking force to a regeneration braking by a motor capable of driving a first axle and braking of the first axle by the hydraulic pressure source is included, and it is preferred that: the hydraulic passages of a plurality of the systems comprise a first hydraulic system for braking the first axle and a second hydraulic system for braking an axle other than the first axle, and the braking force allocating unit increases a braking force allocation ratio, which is a ratio of braking by the hydraulic pressure source to the regeneration braking when a failure is detected in the cutoff valve and the hydraulic pressure detecting unit of the first hydraulic system.

This can suppress decrease in braking force due to a failure.

In the present invention, a braking force allocating unit for controlling allocation of a braking force to a regeneration braking by a motor capable of driving a first axle and braking of the first axle by the hydraulic pressure source is included, and it is preferred that: the hydraulic passages of a plurality of the systems comprises a first hydraulic system for braking the first axle and a second hydraulic system for braking an axle other than the first axle, and allocation control of the braking force by the braking force allocation unit is inhibited and the regeneration braking is stopped, when failure is detected in the cutoff valve and the hydraulic pressure detecting unit of the first hydraulic pressure system.

According to this, omission of regeneration braking in failure can simplify the braking system for braking force control and provides easy design of the braking control under a fail-safe concept.

In the present invention, it is preferred that a first alarming unit for outputting a first alarm when a failure is detected in the cutoff valve and a second alarming unit for outputting a second alarm distinguishable from the first alarm by a driver when a failure is detected in the hydraulic pressure detecting unit are provided.

According to this, not only a driver but also a maintenance man can know whether the failure occurs in the cutoff valve or the hydraulic pressure detecting unit. For the maintenance man it can be easily specified the failure location. In addition, it is sufficient that the first and second alarms are distinguishable from each other. For example, different tones having high and low frequencies, alarm lamps having different colors, different kinds of vibrations at parts or locations to be vibrated such as a seat belt, a seat, and a pedal can be used.

In addition, the present invention provides a braking method for a braking device comprising:

an operation quantity detecting unit for detecting an operation quantity of a brake pedal;

a plurality of systems of hydraulic passages for connection between a tandem type of master cylinder and a plurality of wheel cylinders;

a hydraulic pressure source, installed in the hydraulic passages and being capable of pressurizing a hydraulic pressure in the hydraulic passages, on the basis of the operation quantity detected by the operation quantity detecting unit;

cutoff valves each, installed in each of the hydraulic passages between the master cylinder and the hydraulic pressure source, opening in an opening command state and closing in a closing command state; and a plurality of hydraulic pressure detecting units each for detecting a hydraulic pressure of each of the hydraulic passages on a side of the wheel cylinders with respect to the cutoff valves, wherein:

a first mutual diagnosis based on a hydraulic pressure detected by the hydraulic pressure detecting unit and the operation quantity detected by the operation quantity detecting unit and a second mutual diagnosis based on the hydraulic pressures detected by a plurality of the hydraulic pressure detecting units, in the opening command state are performed, the first and second mutual diagnoses are performed in the closing command state, and failure in the cutoff valves and the hydraulic pressure detecting unit is detected on the basis of results of the first mutual diagnosis and the second mutual diagnosis in the opening command state and the closing command state.

According to this, because the first and second mutual diagnoses are performed in the opening command state and the closing command state of the cutoff valve, the difference in the first mutual diagnosis in the opening command state and the closing command state of the cutoff valve and the difference in the second mutual diagnosis in the opening command state and the closing command state of the cutoff valve can be detected. These differences may occur due to opening and closing the cutoff valve, but when no difference occurs between the opening command state and the closing command state of the cutoff valve, a failure of the cutoff valve can be detected. In addition, when the result of the first mutual diagnosis is abnormal both in the opening command state and closing command state, and when the result of the second mutual diagnosis is abnormal both in the opening command state and the closing command state, failure in the hydraulic pressure detecting unit can be detected. As described above, a failure occurrence source can be specified on the basis of the result of the first and second mutual diagnoses in the opening command state and the closing command state.

Advantageous Effect of Present Invention

According to the present invention, the braking device and the braking method capable of specifying a failure occurrence source are provided.

BRIEF DESCRIPTION OF DRAWINGS

In FIG. 4.

FIG. 5 shows a failure detection in the hydraulic pressure detecting unit according to a first embodiment, in which FIG. 5(a) is a chart illustrating a result of the first mutual diagnosis during the opening command state of the cutoff valve; FIG. 5(b) is a chart illustrating a result of the second mutual diagnosis during the opening command state of the cutoff valve; FIG. 5(c) is a chart illustrating a result of the first mutual diagnosis during the closing command state of the cutoff valve; and FIG. 5(d) is a chart illustrating a result of the second mutual diagnosis during the closing command state of the cutoff valve.

FIG. 6 shows a seizing failure in open of the cutoff valve according to a second embodiment, in which FIG. 6(a) is a chart illustrating a result of the first mutual diagnosis during the opening command state of the cutoff valve; FIG. 6(b) is a chart illustrating a result of the second mutual diagnosis during the opening command state of the cutoff valve; FIG. 6(c) is a chart illustrating a result of the first mutual diagnosis during the closing command state of the cutoff valve; and FIG. 6(d) is a chart illustrating a result of the second mutual diagnosis during the closing command state of the cutoff valve.

FIG. 7 shows a seizing failure in close of the cutoff valve according to a third embodiment, in which FIG. 7(a) is a chart illustrating a result of the first mutual diagnosis during the opening command state of the cutoff valve; FIG. 7(b) is a chart illustrating a result of the second mutual diagnosis during the opening command state of the cutoff valve; FIG. 7(c) is a chart illustrating a result of the first mutual diagnosis during the closing command state of the cutoff valve; and FIG. 7(d) is a chart illustrating a result of the second mutual diagnosis during the closing command state of the cutoff valve.

MODE FOR CARRYING OUT THE INVENTION

Next, embodiments of the present invention will be described with reference to drawings in detail. In each drawing, common parts are designated with the same references and thus a duplicated description will be omitted.

Figure 1:
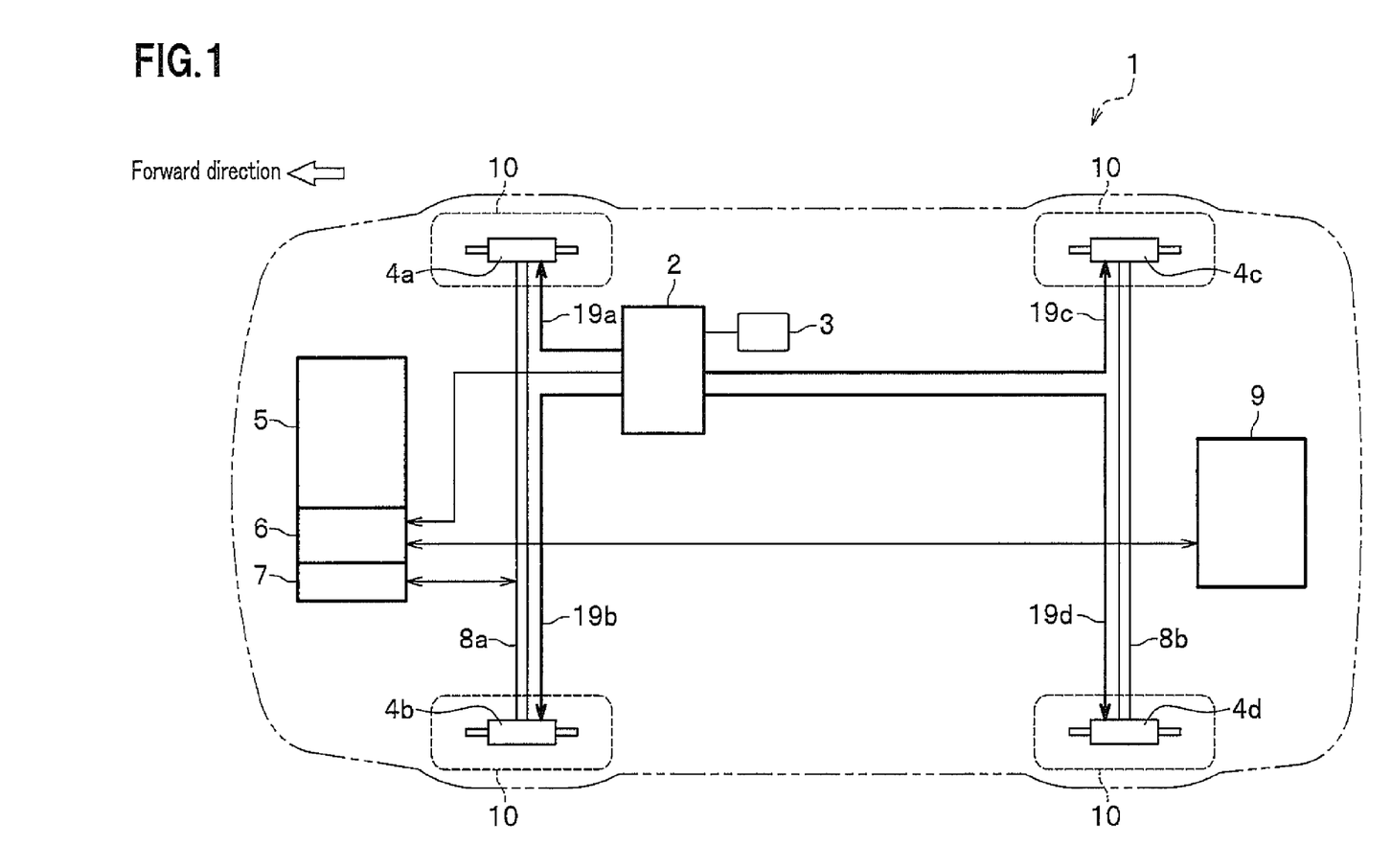
FIG. 1 is a structural drawing of a vehicle in which a braking device according to embodiments of the present invention is installed.

FIG. 1 is a structural drawing illustrating a configuration of a vehicle 1 in which a brake device (body) 2 is installed. The vehicle 1 has four wheels 10. Two front wheels 10 are connected to an axle (first axle) 8a, and two rear wheels 10 are connected to an axle (second axle) 8b. The axle (first axle) 8a receives a drive force generated by at least one of an engine 5 and a motor (electric rotating machine) 6 through a transmission 7 and transmits the drive force to the two front wheels 10 to rotate the two front wheels 10. In addition the axle (first axle) 8a transmits rotation energy (kinetic energy) of the two front wheel 10 to the transmission 7 as regeneration energy as kinetic energy and further transmitted to the motor (electric rotating machine) 6. In the motor (electric rotating machine) 6, the regeneration energy, i.e., the kinetic energy, is converted into electric energy which is stored in a battery 9, which serves to brake the two front wheels 10. In other words, the two front wheels 10 and the axle (first axle) 8a are able to be braked by regeneration breaking with the motor (electric rotating machine) 6. The regeneration energy stored in the battery 9 is used while the motor (electric rotating machine) 6 generates the drive force.

On the other hand, the axle (second axle) 8b does not transmits the drive force from the motor (electric rotating machine) 6, etc., to the two rear wheels 10 and does not transit regeneration energy from the two rear wheels 10 to the motor (electric rotating machine) 6. In addition, the number of the axle (second axle) 8b is not limited to one as shown in FIG. 1, but may be installed for each of two wheels, i.e., two axles in total may be installed.

The four wheels 10 are respectively provided with wheel cylinders 4a, 4b, 4c, 4d. The wheel cylinder 4a is connected to a brake device (body) 2 with a hydraulic passage 19a (first hydraulic system), so that when a hydraulic pressure of the wheel cylinder 4a is increased, this operates the wheel cylinder 4a to brake the corresponding wheel 10. Similarly, the wheel cylinder 4b is connected to the hydraulic passage (first hydraulic system) 19b, so that when a hydraulic pressure of the wheel cylinder 4b is increased through the hydraulic passage 19b from the braking device (body) 2, this operates the wheel cylinder 4b to brake the corresponding wheel 10. The wheel cylinder 4c is also connected to the brake device (body) 2 with the hydraulic passage 19c (second hydraulic system), so that when a hydraulic pressure of the wheel cylinder 4c is increased through the hydraulic passage 19c (second hydraulic system) from the braking device (body), this operates the wheel cylinder 4c to brake the corresponding wheel 10. The wheel cylinder 4d is also connected to the brake device (body) 2 with the hydraulic passage 19d (second hydraulic system), so that when a hydraulic pressure of the wheel cylinder 4d is increased through the hydraulic passage 19d (second hydraulic system) from the braking device (body), this operates the wheel cylinder 4d to brake the corresponding wheel 10. More specifically, the four wheels 10 and the axles 8a, 8b are able to be braked by a braking force generated with the brake device (body) 2 and the wheel cylinders 4a, 4b, 4c, 4d.

The two front wheels 10 and the axles (first axle) 8a are subjected to braking control; by two control methods with a braking force, i.e., the regeneration braking with the motor (electric rotating machine) 6 and a braking force generated with the wheel cylinders 4a, 4b. This braking control is carried out by the brake device (body) 2. More specifically, control such as changing an allocation ratio of the braking force between the regeneration braking and the braking force by the wheel cylinders 4a, 4b and stopping the regeneration braking is performed.

The brake device (body) 2 is provided with the brake pedal 3 which is operated by a driver. The brake pedal 3 serves as an input unit for the brake device (body) 2, and the wheel cylinders 4a, 4b, 4c, 4d serve as an output unit.

Figure 2:
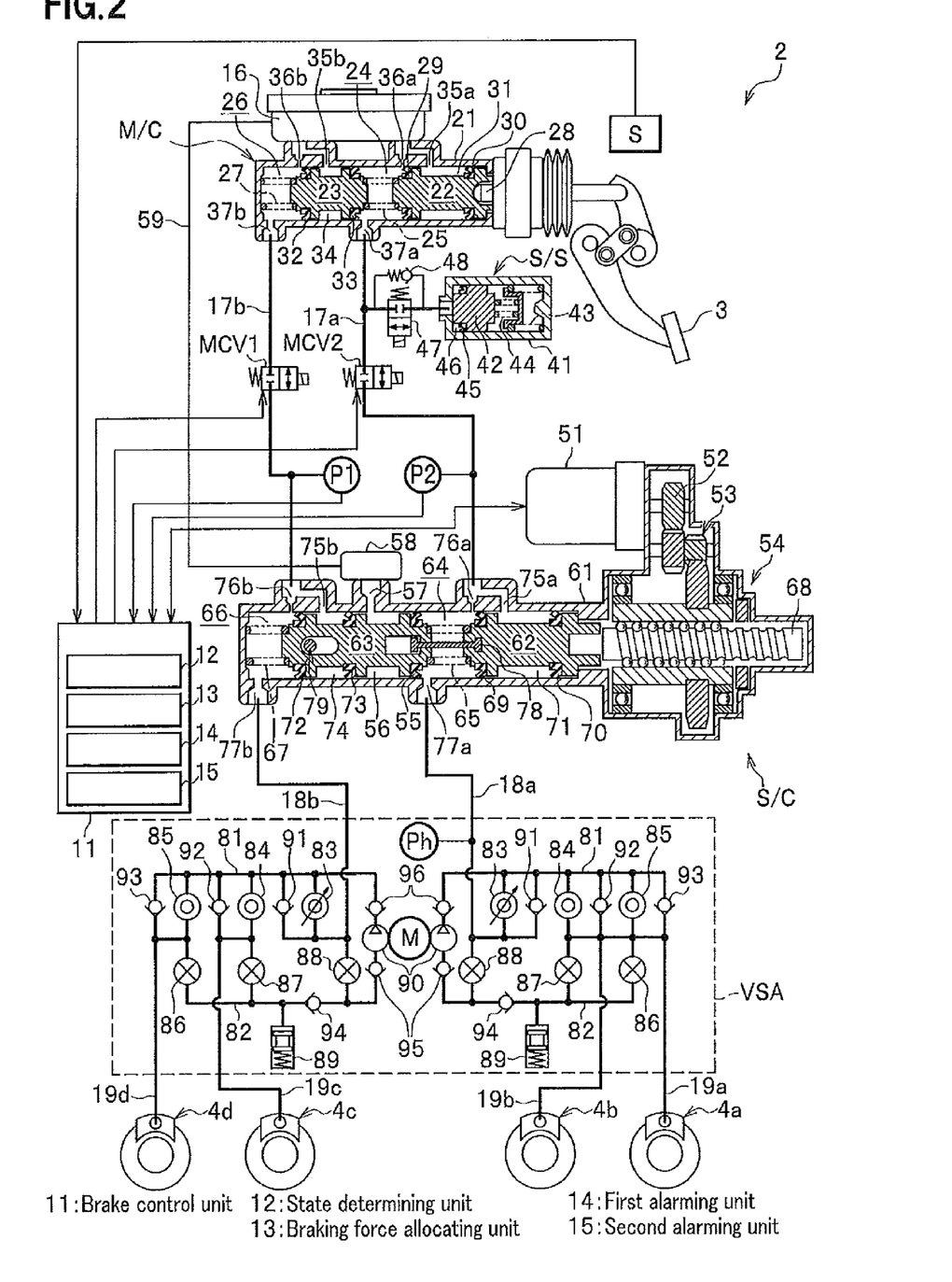
FIG. 2 is a structural drawing of the braking device according to the embodiment of the present invention.

FIG. 2 illustrates a structural view of the brake device (body) 2 according to the embodiment of the present invention. It is noted that for convenience sake, a view of FIG. 2 is not limited to the brake device (body) but shows the whole of the brake device as the brake device 2. More specifically, the brake device (body) 2 includes the brake pedal 3, the wheel cylinders 4a, 4b, 4c, 4d, and the hydraulic passages 19a, 19b, 19c, 19d. In addition, the brake device (body) 2 includes a stroke sensor (operation quantity detecting unit) S for detecting an operation quantity of the brake pedal 3, a tandem type of master cylinder M/C for generating a hydraulic pressure in accordance with an operation of the brake pedal 3 by the driver, hydraulic passages 17a-18a-19a, 17a-18a-19b in the first hydraulic system for connection between a first hydraulic chamber 24 of the master cylinder M/C and a plurality of wheel cylinders 4a, 4b, and hydraulic passages 17b-18b-19c, 17b-18b-19d in the second hydraulic system for connection between the hydraulic chamber 26 of the master cylinder M/C and a plurality of wheel cylinders 4c, 4d.

In addition, the brake device (body) 2 includes a slave cylinder (hydraulic power source) S/C. The slave cylinder S/C is disposed on the hydraulic passages 17a-18a of the first hydraulic system and the hydraulic passages 17b-18b of the second hydraulic system. The slave cylinder S/C can increase a hydraulic pressures of the hydraulic passage 18a of the first hydraulic system and the hydraulic passage 18b of the second hydraulic system on the basis of an operation quantity of the brake pedal 3 detected by the stroke sensor S.

In addition the brake device (body) 2 includes a master cut valve (cutoff valve: normally open) MCV1, MCV2. The master cut valve MCV1 is disposed on the hydraulic passage 17b of the second hydraulic system between the first hydraulic chamber 26 of the master cylinder M/C and a first hydraulic chamber 66 of the slave cylinder S/C. The master cut valve MCV2 is disposed on the hydraulic passage 17a of the first hydraulic system between a second hydraulic chamber 24 of the master cylinder M/C and a second hydraulic chamber 64 of the slave cylinder S/C. The master cut valves MCV1, MCV2 are configured to be closed in a closing command status when a closing command is received from the brake control unit 11, and to be opened in an opening command status when an opening command is received from the brake control unit 11.

In addition, the brake device (body) 2 includes P sensors (pressure sensor, hydraulic pressure detecting units) P1, P2. The P sensor P1 is disposed on a side of the wheel cylinders 4c, 4d with respect to the master cut valve MCV1 on the hydraulic passage 17b of the second hydraulic system. The P sensor P1 can detect (measure) a hydraulic pressure on a side of the wheel cylinders 4c, 4d with respect to the master cut valve MCV1 on the hydraulic passage 17b of the second hydraulic system. The P sensor P2 can detect (measure) a hydraulic pressure on a side of the wheel cylinders 4a, 4b with respect to the master cut valve MCV2 on the hydraulic passage (first hydraulic system) 17a.

In addition, the brake device (body) 2 includes, as other main components, a stroke simulator S/S, a vehicle stability assist VSA, and a brake control unit 11.

The stroke simulator S/S is disposed on the hydraulic passage 17a of the first hydraulic system on a side of the master cylinder M/C with respect to the master cut valve MCV2. The stroke simulator S/S can absorb a brake fluid supplied by the second hydraulic chamber 24 of the master cylinder M/C.

The vehicle stability assist VSA is disposed between the slave cylinder S/C and the wheel cylinders 4a, 4b, 4c, 4d and further between the hydraulic passage 18a of the first hydraulic system and the hydraulic passages 19a, 19b. In addition, the vehicle stability assist VSA is disposed between the hydraulic passage 18b of the second hydraulic system and the hydraulic passages 19c, 19d.

The brake control unit 11 includes a state determining unit 12, a braking force allocating unit 13, a first alarming unit 14, and a second alarming unit 15. The state determining unit 12 determines a status of failure, i.e., what is a failure source and what type of failure is the failure. The braking force allocating unit 13 performs control such as changing an allocation ratio of a braking force between the braking force by regeneration braking and the braking force by the wheel cylinders 4a, 4b or stopping the regeneration braking. The first alarming unit 14 outputs a first alarm when the state determining unit 12 detects failure of the master cut valves MCV1, MCV2. The second alarming unit 15 outputs a second alarm when the state determining unit 12 detects a failure of the P sensors P1, P2. The first and second alarms distinguishable for the driver are used.

The master cylinder M/C includes a second piston 22 and a first piston 23 to be slidably fit into a cylinder 21. A second return spring 25 is disposed in a second hydraulic chamber 24 sectioned in front of the second piston 22. A first return spring 27 is disposed in a first hydraulic chamber 26 sectioned in front of the first piston 23. A rear end of the second piston 22 is connected to the brake pedal 3 through a push rod 28. When the driver presses the brake pedal 3, the first piston 23 and the second piston 22 move forward, which generates a brake hydraulic pressure in the first hydraulic chamber 26 and the hydraulic chamber 24.

A second back chamber 31 is formed between a cup seal 29 and a cup seal 30 of the second piston 22. A first back chamber 34 is formed between a cup seal 32 and a cup seal 33 of the first piston 23. Formed in the cylinder 21 are a supply port 35a communicating with the second back chamber 31 toward a front from the rear thereof, a relief port 36a having an opening toward the second hydraulic chamber 24 just before the cup seal 29, an output port 37a having an opening toward the second hydraulic chamber 24, a supply port 35b communicating with the first back chamber 34, a relief port 36b having an opening toward the first hydraulic chamber 26 just before the cup seal 32, and an output port 37b having an opening toward the first hydraulic chamber 26. The supply port 35a is joined to the relief port 36a and communicates with a reserver 16. The supply port 35b is joined to the relief port 36b and communicates with a reserver 16. Connected to the output port 37a is a hydraulic passage (first hydraulic system) 17a.

Connected to an output port 37b is the hydraulic passage (second hydraulic system) 17b.

The stroke simulator S/S has a low increase gradient of a pedal reaction force at an earlier stage of pressing the brake pedal 3, and a high increase gradient of the pedal reaction force at a later stage of pressing the brake pedal 3 to enhance a pedal feeling in which the piston 42 is energized by a second return spring 44 having a low spring constant and a first return spring 43 having a higher spring constant which are disposed in series. On an opposite side of the second return spring 44 with respect to the piston 42, the hydraulic chamber 46 is sectioned. The hydraulic chamber 46 is connected to the hydraulic passage (first hydraulic system) 17a through a cutoff valve (normally close) 47. Connected to the cutoff valve (normally close) 47 is a check valve 48 for allowing the brake fluid to flow from the hydraulic chamber 46 to the hydraulic passage (first hydraulic system) 17a, but does not allow the brake liquid to flow reversely. In addition, the piston 42 is provided with a cup seal 45, which prevents the brake fluid from leaking from the side of the hydraulic chamber 46 through the cup seal 45.

The slave cylinder S/C is provided with a second piston 62 and a first piston 63 which are to be slidably fit into a cylinder 61. A second return spring 65 is disposed in a second hydraulic chamber 64 sectioned in front of the second piston 62. A first return spring 67 is disposed in a first hydraulic chamber 66 sectioned in front of the first piston 63. A rear end of the second piston 62 is connected to a motor (electric rotating machine) 51 through a push rod 68, a ball screw mechanism 54, a reduction mechanism 53, and a gear 52. When the motor (electric rotating machine) 51 rotates in accordance with braking control by the brake control unit 11, the push rod 68, the first piston 63, the second piston 62 move forward, which generates a brake hydraulic pressure in the first hydraulic chamber 66 and the second hydraulic chamber 64.

A second back chamber 71 is formed between a cup seal 69 and a cup seal 70 of the second piston 62. A first back chamber 74 is formed between a cup seal 72 and a cup seal 73 of the first piston 63. a third back chamber 56 is formed between the cup seal 73 and the cup seal 55 of the first piston 63. Formed in the cylinder 61 are a supply port 75a communicating with the second back chamber 71 in a direction to a front from the rear thereof, a relief port 76a having an opening toward the second hydraulic chamber 64 just before the cup seal 69, an output port 77a having an opening toward the second hydraulic chamber 64, a return port 57 communicating with a third back chamber 56, a supply port 75b communicating with the first back chamber 74, a relief port 76b having an opening toward the first hydraulic chamber 66 just before the cup seal 72, and an output port 77b having an opening toward the first hydraulic chamber 66. The supply port 75a is joined to the relief port 76a and communicates with the hydraulic passage (first hydraulic system) 17a. The supply port 75b is joined to the relief port 76b and communicates with the hydraulic passage (second hydraulic system) 17b. The return port 57 is connected to the reserver 16 through the check valve 58 and the hydraulic passage 59. Connected to the output port 77a is the hydraulic passage (first hydraulic system) 18a. Connected to the output port 77b is the hydraulic passage (second hydraulic system) 18b.

In such an abnormal status that the slave cylinder S/C becomes inoperative, a brake pressure generated by the second hydraulic chamber 24 of the master cylinder M/C, passing through the second hydraulic chamber 64 of the slave cylinder S/C, operates the wheel cylinders 4a, 4b of the first hydraulic system, and a brake pressure generated by the first hydraulic chamber 26 of the master cylinder M/C, passing through the first hydraulic chamber 66 of the slave cylinder S/C, operates the wheel cylinders 4c, 4d of the second hydraulic system. At this instance, when the hydraulic passages (second hydraulic system) 18b, 19c, 19d connecting the first hydraulic chamber 66 of the slave cylinder S/C and the wheel cylinders 4c and 4d of the second hydraulic system are defected, a hydraulic pressure of the first hydraulic chamber 66 is lost, so that the first piston 63 will move forward to the second piston 62, a volume of the second hydraulic chamber 64 expanding, which may cause decrease in a brake pressure supplied to the wheel cylinders 4a, 4b of the first hydraulic system. However, a restricting unit 78 restricts maximum and minimum distances between the first piston 63 and the second piston 62, and a restricting unit 79 restricts a sliding range of the first piston 63, which prevents the volume of the second hydraulic chamber 64 from expanding even if the hydraulic pressure of the first hydraulic chamber 66 is lost. This surely operates the wheel cylinders 4a, 4b of the first hydraulic system to secure the braking force.

In the vehicle stability assist VSA, a configuration of the first hydraulic system from the hydraulic passage 18a to the hydraulic passages 19a, 19b is the same as that from the hydraulic passage 18b to the hydraulic passages 19c, 19d. To make it easy to understand this, components in the first hydraulic system of the vehicle stability assist VSA are designated with the same references for the corresponding components in the second hydraulic system. The first hydraulic system from the hydraulic passage 18a to the hydraulic passages 19a, 19b is exemplified for the following description.

The vehicle stability assist VSA includes a hydraulic passage 81 and a hydraulic passage 82 which are common regarding the wheel cylinders 4a, 4b (4c, 4d). The vehicle stability assist VSA further includes:

a regular valve (normally open) 83 comprising a normally open solenoid valve, disposed between the hydraulic passage 18a (18b) and the hydraulic passage 81, having a variable opening angle, a check valve 91, disposed in parallel to the regular valve (normally open) 83, allowing the brake fluid to flow to a side of the hydraulic passage 81 from the hydraulic passage 18a (18b), an in valve (normally open) 85 comprising a normally open type solenoid valve disposed between the hydraulic passage 81 and the hydraulic passage 19a (19b), a check valve 93, disposed in parallel to the in valve 85, allowing the brake fluid to flow from a side of the hydraulic passage 19a (19d) to a side of the hydraulic passage 81, an in valve (normally open) 84 comprising a normally open type of solenoid valve, disposed between the hydraulic passage 81 and the hydraulic passage 19b (19c), a check valve 91, disposed in parallel to the in valve (normally open) 84, allowing the brake fluid to flow to a side of the hydraulic passage 81 from a side of the hydraulic passage 19b (19c), an out valve (normally close) 86, disposed between the hydraulic passage 19a (19d) and the hydraulic passage 82, comprising a normally close type of solenoid valve, an out valve (normally close) 87 comprising a normally close type of solenoid valve, disposed between the hydraulic passage 19b (19c) and the hydraulic passage 82, a reserver 89 connected to a hydraulic passage 82, a check valve 94, disposed between the hydraulic passage 82 and the hydraulic passage 81, for allowing the brake fluid to flow from the side of the hydraulic passage 82 to the side of the hydraulic passage 81, a pump 90, disposed between the check valve 94 and the hydraulic passage 81, for supplying the brake fluid from the side of the hydraulic passage 82 to the side of the hydraulic passage 81, check valves 95, 96, disposed before and after the pump 90, for allowing the brake fluid to flow from the side of 82 to the side of the hydraulic passage 81, a motor (electric rotating machine) M for driving the pump 90, and a suction valve (normally close) 88 comprising a normally close type of solenoid valve disposed between the a middle position between the check valve 94 and the check valve 95 and the hydraulic passage 18a (18b). A pressure sensor Ph is disposed on the hydraulic passage 18a on the side of the vehicle stability assist VSA for detecting a hydraulic pressure of the brake fluid generated by the slave cylinder S/C.

Figure 3:
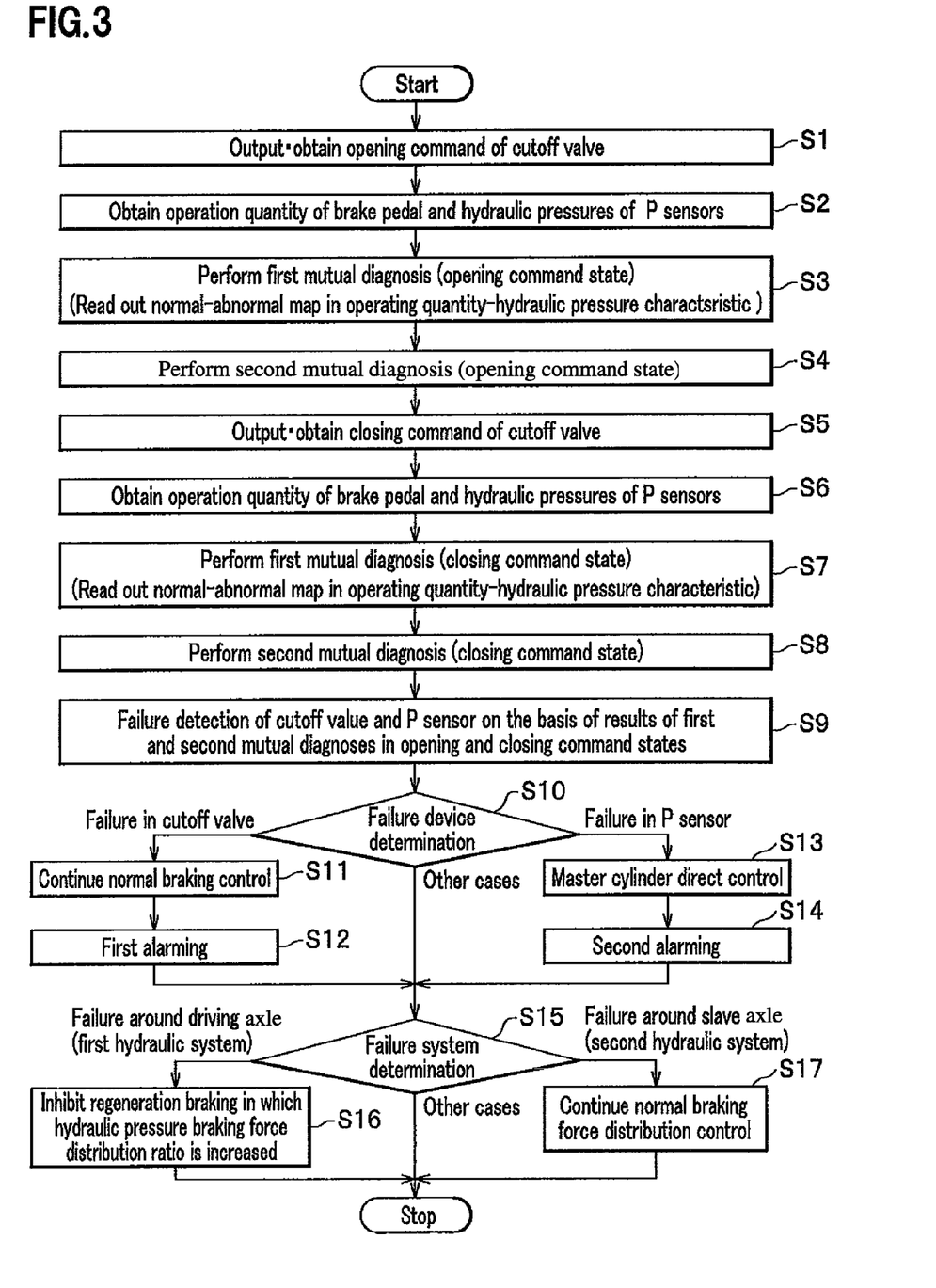
FIG. 3 is a flowchart of a braking method conducted in the braking device according to the embodiments of the present invention.

FIG. 3 illustrates a flowchart of a control method conducted in the brake device 2 (see FIG. 2) according to the embodiment of the present invention.

First, in a step S1, the brake control unit 11 outputs an opening command to the master cut valves MCV1, MCV2. In addition, the brake control unit 11 may confirm that the opening command is outputted by itself by acquiring the opening command.

In step S2, the brake control unit 11 obtains the operation quantity of the brake pedal 3 from the stroke sensor S and at the same time obtains hydraulic pressures of the P sensors P1, P2.

Figure 4:
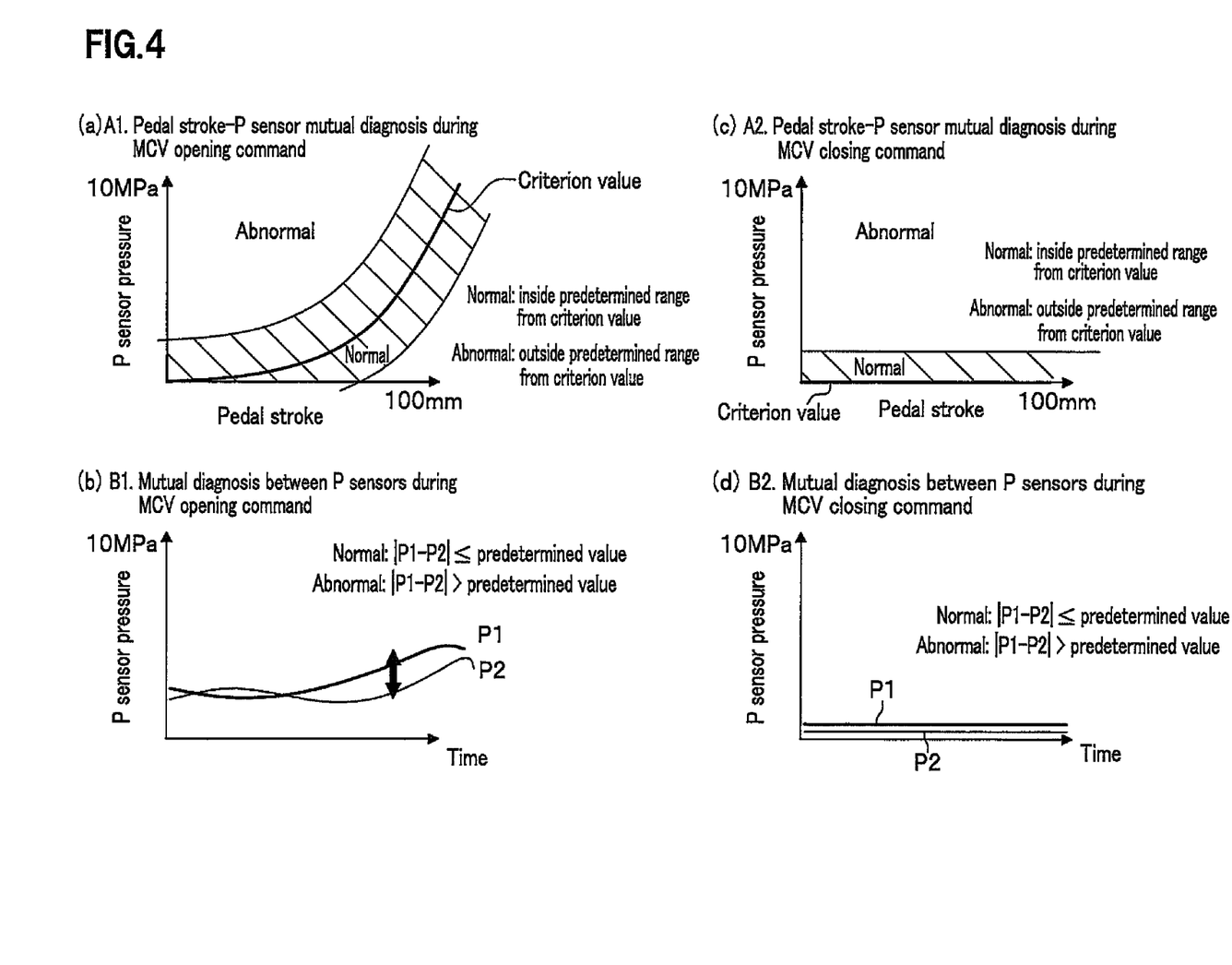
FIG. 4(a) is a chart illustrating outline of the first mutual diagnosis based on a hydraulic pressure detected by the hydraulic pressure detecting unit and an operation quantity detected by the operation quantity detecting unit during an opening command state of cutoff valves.
FIG. 4(b) is a chart illustrating outline of the second mutual diagnosis based on the hydraulic pressure detected by a plurality of hydraulic pressure detecting units during the opening command state of the cutoff valve.
FIG. 4(c) is a chart illustrating outline of the first mutual diagnosis during the closing command state of the cutoff valve.
FIG. 4(d) is a chart illustrating outline of the second mutual diagnosis during the closing command state of the cutoff valve.

In a step S3, the brake control unit 11 performs a first mutual diagnosis (opening command state) when the master cut valves MCV1, MCV2 are in opening command states. In the first mutual diagnosis (in the opening command state), a characteristic of pedal stroke (operation quantity)-P sensor pressure (hydraulic pressure) in a normal state as shown in FIG. 4 (a), i.e., between the pedal stroke (operation quantity) and the P sensor pressure (hydraulic pressure) detected by at least one of the P sensors P1, P2, is previously stored in the brake control unit 11. When at least one of the hydraulic pressures detected by the P sensors P1, P2 to the pedal stroke (operation quantity), obtained in the step S2 is inside a predetermined range from a criterion value of at least one of the hydraulic pressures detected by the P sensors P1, P2 to the pedal stroke (operation quantity), obtained in the step S2 in the normal state, the state is diagnosed as normal, but when it is outside, the state is diagnosed as abnormal.

In a step S4, the brake control unit 11 performs a second mutual diagnosis (opening command state) when the master cut valves MCV1, MCV2 are in the opening command states. In the second mutual diagnosis (opening command state), when a difference pressure (|P1−P2|) between the P sensor pressures (hydraulic pressure) detected by the P sensors P1, P2 is inside a predetermined range in the opening command states of the master cut valves MCV1, MCV2 as shown in FIG. 4(b), the state is diagnosed as normal, but when the difference pressure is outside it, the state is diagnosed as abnormal.

In a step S5, the brake control unit 11 outputs a closing command to the master cut valves MCV1, MCV2. In addition, the brake control unit 11 may confirm that the closing command is outputted by itself by acquiring the closing command.

In a step S6, the brake control unit 11 obtains the operation quantity of the brake pedal 3 from the stroke sensor S and simultaneously obtains a hydraulic pressure of the corresponding one of the P sensors P1, P2.

In a step S7, the brake control unit 11 performs the first mutual diagnosis (closing command state) when the master cut valves MCV1, MCV2 are in the closing command states. In the first mutual diagnosis (closed command state), a characteristic (criterion value) of pedal stroke (operation quantity)-P sensor pressure (hydraulic pressure) in a normal state as shown in FIG. 4 (c), i.e., between the pedal stroke (operation quantity) and the P sensor pressure (hydraulic pressure) detected by at least one of the P sensors P1, P2, is previously stored in the brake control unit 11. When the hydraulic pressure detected by at least one of the P sensors P1 and P2 to the pedal stroke (operation quantity), obtained in the step S6 is inside a predetermined range from a criterion value of the at least one of the hydraulic pressures detected by the P sensors P1, P2 to the pedal stroke (operation quantity) obtained in the step S6 in the normal state, the state is diagnosed normal, but when it is outside, the state is diagnosed as abnormal.

In a step S8, the brake control unit 11 performs the second mutual diagnosis (closing command state) when the master cut valves MCV1, MCV2 are in the closing command states. In the second mutual diagnosis (closing command state), when a difference pressure between the P sensor pressures (hydraulic pressure) P1 and P2 detected by the P sensors P1, P2 (|P1−P2|) is equal to or smaller than a predetermined value previously stored in the brake control unit 11 in the closing command states of the master cut valve MCV1, MCV2 as shown in FIG. 4(d), the state is diagnosed as normal, but when the difference pressure is outside it, the state is diagnosed as abnormal.

In a step S9, the state determining unit 12 of the brake control unit 11 performs a failure detection of the master cut valves MCV1 and MCV2 and the P sensors P1, P2 on the basis of results of the first and second mutual diagnoses in the opening and closing command states. In addition, a specific example of the failure detection will be described in detail in first to third embodiments described later.

In a step S10, the state determining unit 12 discriminates a device of which failure has been detected on the basis of the failure detection in the step S9. When the master cut valves (cut off valve) MCV1, MCV2 are determined to have failure, processing proceeds to a step S11. When the P sensors P1, P2 are determined to have failure, processing proceeds to S13. In other cases, such as when no device has been determined to have failure, processing proceeds to a step S15.

In a step S11, the brake control unit 11 continues the normal braking control to the slave cylinder (hydraulic pressure source) S/C.

In a step S12, a first alarming unit 14 of the brake control unit 11 generates a first alarm. After that, processing proceeds to the step S15.

In a step S13, the brake control unit 11 causes the slave cylinder (hydraulic source) S/C, etc., to stop the normal braking control and performs a direct control with the master cylinder M/C.

In the step S14, a second alarming unit 15 of the brake control unit 11 generates a second alarm. After that, processing proceeds to the step S15.

In the step S15, the state determining unit 12 determines, on the basis of the failure detection in the step S9, which one of the first hydraulic system side and the second hydraulic side the device detected as failure is on.

When the device having the failure is on the side of the first hydraulic system, i.e., around the first axle (driving axis) 8a, processing proceeds to a step S16, and when the device having the failure is on the side of the second hydraulic system, i.e., around the second axis (slave axis) 8b, processing proceeds to a step S17. In a case where no device has been determined to have a failure, and other cases, a flow of this braking method is stopped.

In the step S16, a braking force allocating unit 13 of the brake control unit increases a braking force allocation ratio which is a ratio of braking by the slave cylinder (hydraulic pressure source) S/C to that by the regeneration braking when failure is detected in the master cut valve (cutout valve) MCV2 of the first hydraulic system and the P sensor (hydraulic pressure detecting unit) P2. Alternatively, in place of this, control of allocating the braking force by the braking force allocating unit 13 may be inhibited to stop the regeneration braking. Then, the flow of this braking method is stopped.

In a step S17, the braking force allocating unit 13 maintains the braking force allocation ratio which is the ratio of braking by the slave cylinder (hydraulic source) S/C to that by the regeneration braking when failure is detected in the master cut valve (cutout valve) MCV1 of the second hydraulic system and the P sensor (hydraulic pressure detecting unit) P1 at a general ratio (a value other than 0) to continue a general braking allocation control. Then, the flow of this braking method is stopped.

Next, will be described specific examples of failure detection in the master cut valve MCV1 and the master cut valve MCV2, and the P sensors P1, P2 on the basis of the results of the first and second mutual diagnoses in the closing and opening command states in first to third embodiments.

First Embodiment

Figure 5:
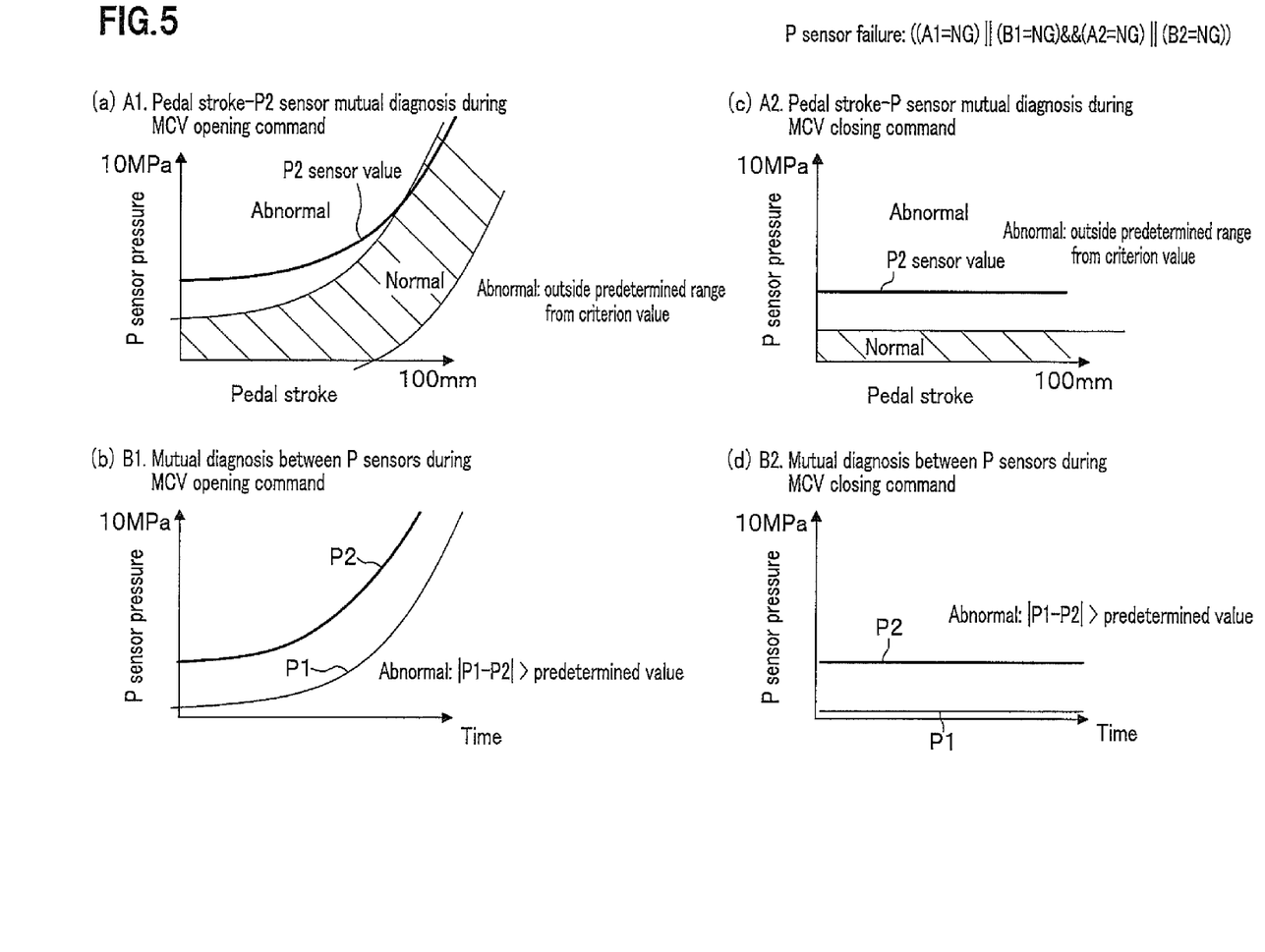

With reference to FIG. 5, will be described a case where a failure in the P sensor (hydraulic pressure detecting unit) P2 can be detected as the first embodiment. FIG. 5 (a) shows a result (A1) of the first mutual diagnosis while the master cut valve MCV1 and the master cut valve MCV2 are in the opening command states. Because the hydraulic pressure detected by the P sensor P2 to the pedal stroke (operation quantity) obtained in the step S2 is outside the predetermined range from the criterion value of the hydraulic pressure of the P sensor P2 to the pedal stroke (operation quantity) in a normal state, obtained in the step S2, the state is diagnosed as abnormal (A1=NG).

FIG. 5 (b) shows the result (B1) of the second mutual diagnosis while the master cut valves MCV1, MCV2 are in the opening command states. Because the difference pressure between the P sensors P1, P2 (|P1−P2|) exceeds the predetermined value previously stored in the brake control unit 11, the state is diagnosed as abnormal (B1=NG).

FIG. 5 (c) shows a result (A2) of the first mutual diagnosis while the master cut valves (cutoff valves) MCV1, MCV2 are in the closing command states. Because the hydraulic pressure detected by the P sensor P2 to the pedal stroke (operation quantity) obtained in the step S2 is outside the predetermined range from the criterion value of the hydraulic pressure detected by the P sensor P2 to the pedal stroke (operation quantity) in the normal state, obtained in the step S2, the state is diagnosed as abnormal (A2=NG).

FIG. 5 (d) shows a result (B2) of the second mutual diagnosis while the master cut valves (cutoff valves) MCV1, MCV2 are in the closing command states. Because the difference pressure between the P sensors P1, P2 (|P1−P2|) exceeds the predetermined value previously stored in the brake control unit 11, the state is diagnosed as abnormal (B2=NG).

When all results of the first and second mutual diagnoses in the opening command states and the closing command states are failure, ((A1=NG)|(B1=NG)&&(A2=NG)|(B2=NG)), the failure in the P sensor P2 can be detected.

When the results of the first mutual diagnosis in the opening command state and the closing command state show normal, but the second mutual diagnosis is detected to be abnormal in the closing and opening command states, ((A1=OK)|(B1=NG)&&(A2=OK)|(B2=NG)), the failure in the P sensor P1 which is a diagnosis target of the second mutual diagnosis, but not a target of the first mutual diagnosis, can be detected.

Second Embodiment

Figure 6:
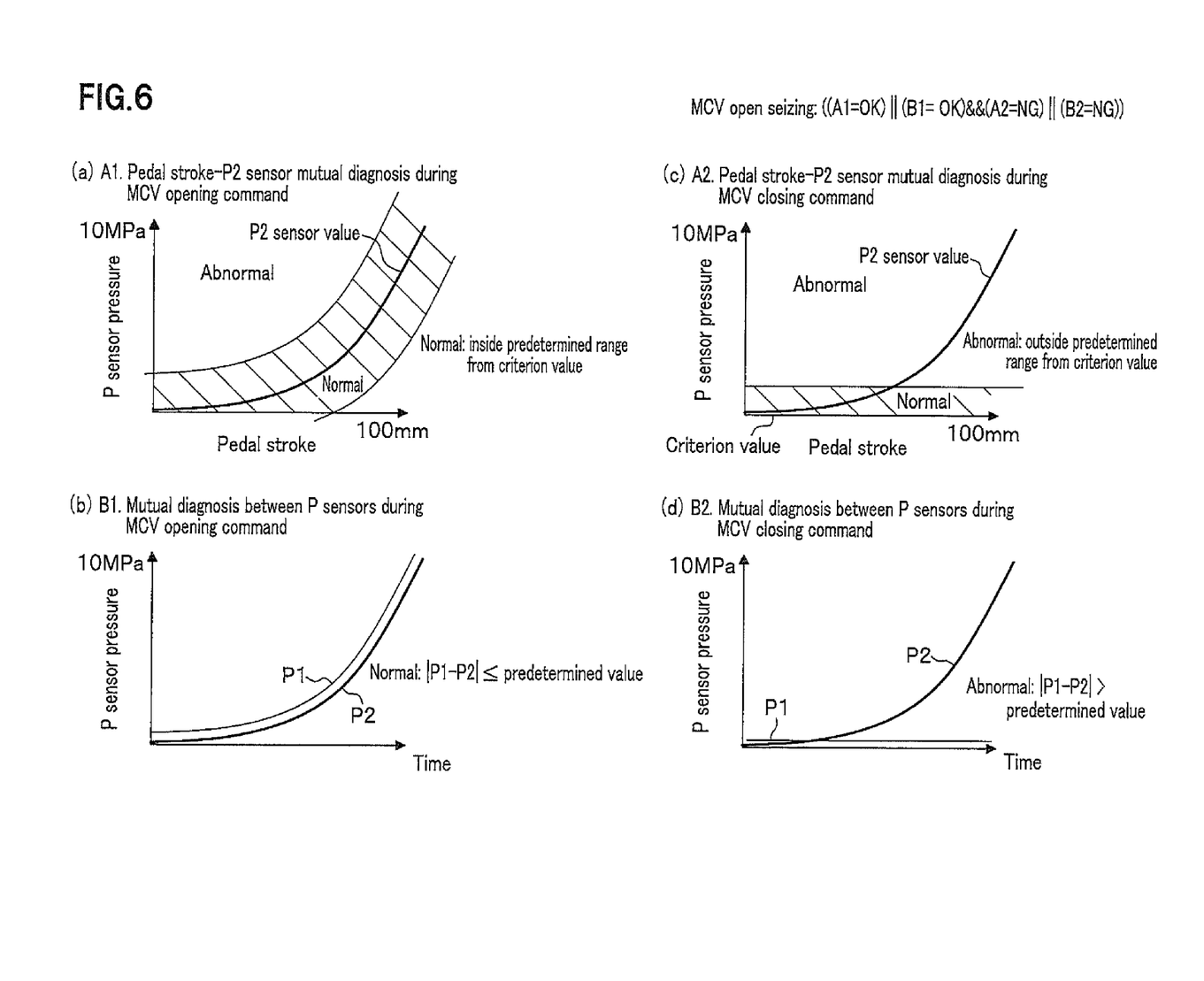

With reference to FIG. 6, will be described a case where a seizing failure in open of the master cut valve (cutoff valve) MCV2 can be detected as a second embodiment. FIG. 6 (a) shows a result (A1) of the first mutual diagnosis while the master cut valves (cutoff valves) MCV1, MCV2 are in the opening command states. Because the hydraulic pressures (P2 sensor value) detected by the P sensor P2 to the pedal stroke (operation quantity) obtained in the step S2 is inside the predetermined range from the criterion value of the hydraulic pressure detected by the P sensor P2 to the pedal stroke (operation quantity) obtained in a normal sated in the step S2, the state is diagnosed as normal (A1=OK). FIG. 6 (b) shows the result (B1) of the second mutual diagnosis while the master cut valves MCV1, MCV2 are in the opening command states. Because the difference of hydraulic pressures between the P sensors P1, P2 (|P1−P2|) is inside the predetermined value previously stored in the brake control unit 11, the state is diagnosed as normal (B1=OK).

FIG. 6 (c) shows a result (A2) of the first mutual diagnosis while the master cut valves (cutoff valves) MCV1, MCV2 are in the closing command states. Because the hydraulic pressure (P2 sensor value) detected by the P sensor P2 to the pedal stroke (operation quantity) obtained in the step S2 is outside the predetermined range from the criterion value of the hydraulic pressures detected by the P sensor P2 to the pedal stroke (operation quantity) obtained in the normal state, in the step S2 in the pedal stroke-P sensor pressure characteristic (criterion value), the state is diagnosed as abnormal (A2=NG).

FIG. 6 (d) shows a result (B2) of the second mutual diagnosis while the master cut valves (cutoff valves) MCV1, are in the closing command states. Because the difference pressure between the hydraulic pressures detected by the P sensors P1, P2 (|P1−P2|) exceeds the predetermined value previously stored in the brake control unit 11, the state is diagnosed as abnormal (B2=NG).

When the results of the first and second mutual diagnoses in the opening command state show a normal detection, but the first and second mutual diagnoses in the closing command state are abnormal ((A1=OK)|(B1=OK)&&(A2=NG)|(B2=NG)), the seizing failure in open of the master cut valve (cutoff valve) MCV2 can be detected.

In addition, when the results of the first and second mutual diagnoses in the opening command state and of the first mutual diagnosis in the closing command state and of the first mutual diagnosis in the closing command state are normal, but the second mutual diagnosis in closing command state is abnormal (A1=OK)||(B1=OK)&&(A2=OK)||(B2=NG)), the seizing failure in open in the master cut valve MCV1 can be detected. More specifically, open seizing of the master cut valve MCV1 in the same system as the P sensor P1 which is outside a diagnosis target of the first mutual diagnosis, but a target of the second mutual diagnosis can be detected.

Third Embodiment

Figure 7:
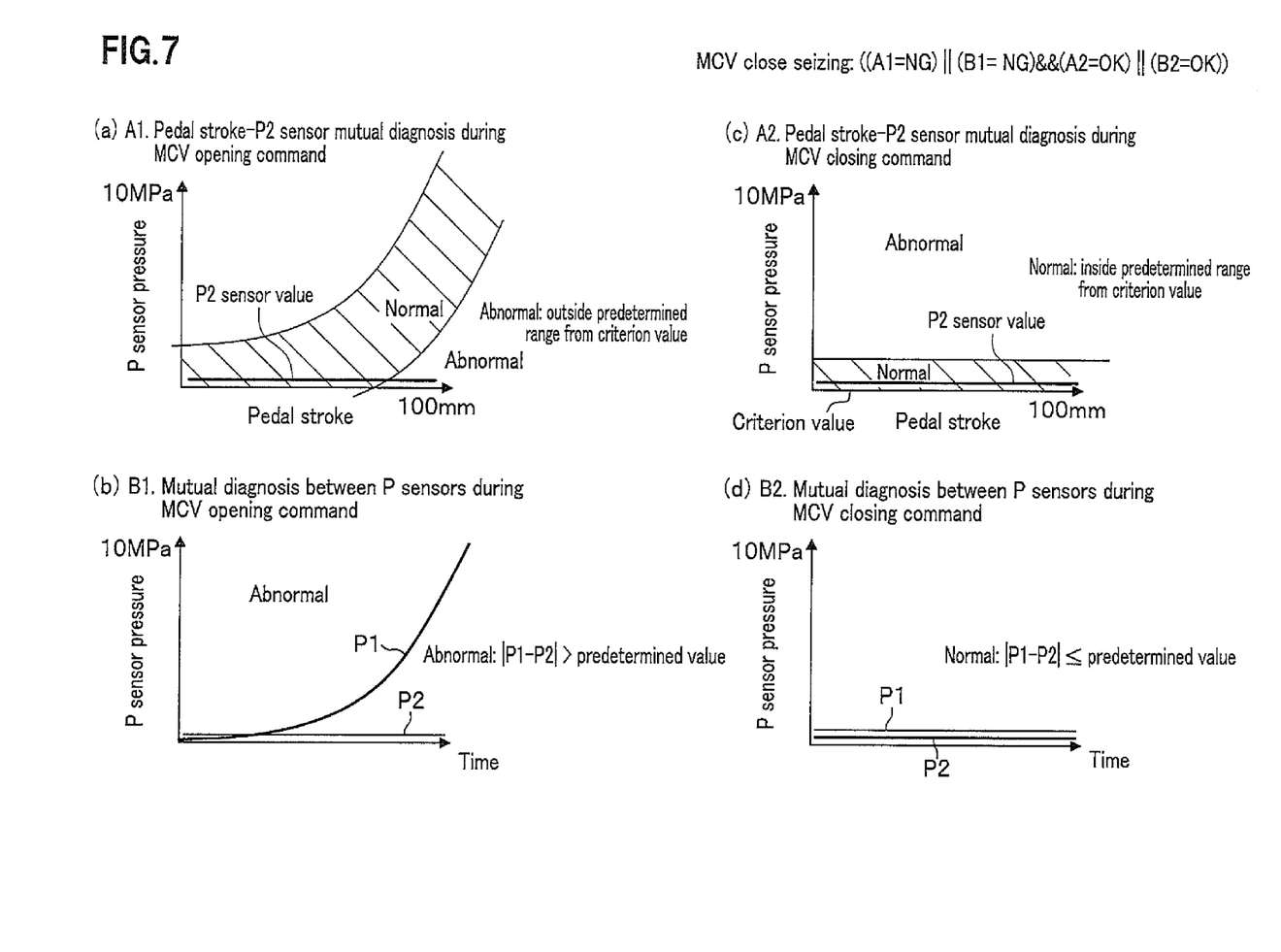

With reference to FIG. 7, will be described a case where close seizing failure of the master cut valve (cutoff valve) MCV2 can be detected. FIG. 7 (a) shows a result (A1) of the first mutual diagnosis while the master cut valves (cutoff valves) MCV1, MCV2 are in the opening command states. Because the hydraulic pressure (P2 sensor value) detected by the P sensor P2 to the pedal stroke (operation quantity) obtained in the step S2 is outside the predetermined range from the criterion value of the hydraulic pressure detected by the P sensor P2 to the pedal stroke (operation quantity) obtained in the normal sate in the step S2, the state is diagnosed as abnormal (A1=NG).

FIG. 7 (b) shows the result (B1) of the second mutual diagnosis while the master cut valves (cutoff valves) MCV1, MCV2 are in the opening command states. Because the difference of hydraulic pressures between the P sensors P1, P2 (|P1−P2|) detected in the step S2 is inside the predetermined value previously stored in the brake control unit 11, the state is diagnosed as abnormal (B1=NG).

FIG. 7(c) shows a result (A2) of the first mutual diagnosis while the master cut valve MCV1 and the master cut valve MCV2 are in the closing command states. Because the hydraulic pressure (P2 sensor value) detected by the P sensor P2 to the pedal stroke (operation quantity) obtained in the step S2 is inside the predetermined range from the criterion value of the hydraulic pressure detected by the P sensor P2 to the pedal stroke (operation quantity) in the normal states, obtained in the step S2, the state is diagnosed as normal (A2=OK).

FIG. 7(d) shows a result (B2) of the second mutual diagnosis while the master cut valves (cutoff valves) MCV1, MCV2 are in the closing command states. Because the difference of hydraulic pressures between the P sensors P1, P2 (|P1−P2|) detected in the step S2 is inside the predetermined value previously stored in the brake control unit 11, the state is diagnosed as normal (B2=OK).

In addition, when the results of the first and second mutual diagnoses in the opening command state are abnormal, but the results of the first and second mutual diagnoses in the closing command state are normal ((A1=NG)||(B1=NG)&&(A2=OK)|(B2=OK)), the close seizing failure in the master cut valve MCV2 can be detected.

In addition, when the result of the second mutual diagnosis in the opening command state show a abnormal detection, but the first mutual diagnosis in the opening command state and both the results of the first and second mutual diagnoses in the closing command state show normal detections ((A1=OK)|(B1=NG)&&(A2=OK)|(B2=OK)), a close seizing failure of the master cut valve MCV1 can be detected. More specifically the close seizing of the master cut valve MCV1 in the same system as the P sensor P1 which is not a diagnosis target of the first mutual diagnosis but a diagnosis target of the second mutual diagnosis can be detected.

DESCRIPTION OF REFERENCES 1 vehicle
2 brake device (body)
3 brake pedal
4a, 4b, 4c, 4d wheel cylinders
6 motor
8a, 8b axles
11 brake control unit
12 state determining unit
13 braking force allocating unit
14 first alarming unit
15 second alarming unit
17a, 18a, 19a, 19b hydraulic passages (first hydraulic pressure system)
17b, 18b, 19c, 19d hydraulic passages (second hydraulic pressure system)
M/C master cylinder
MCV1, MCV2 master cut valves (cutoff valve: normally open)
P1, P2 P sensors (pressure sensor, hydraulic pressure detecting unit)
S stroke sensor (operating quantity detecting unit)
S/C slave cylinder (hydraulic pressure source)
S/S stroke simulator
VSA vehicle stability assist

The invention claimed is:

1. A braking device comprising:
a tandem type master cylinder including a plurality of hydraulic chambers which generate hydraulic fluid pressures by an operation of a brake pedal by an operator;
an operation quantity detecting unit for detecting an operation quantity of the brake pedal;
a plurality of systems of hydraulic passages connecting the hydraulic chambers of the master cylinder to a plurality of wheel cylinders;
a hydraulic pressure source installed in the systems of hydraulic passages and being capable of pressurizing a hydraulic fluid in the hydraulic passages based on the operation quantity detected by the operation quantity detecting unit;
cutoff valves installed in the systems of hydraulic passages, respectively, between the master cylinder and the hydraulic pressure source, and being closed in a closing command state or being opened in an opening command state;
a plurality of hydraulic pressure detecting units for respectively detecting hydraulic fluid pressures of the hydraulic passages on a side of the wheel cylinders with respect to the cutoff valves; and
a brake control unit, wherein:
when the cutoff valves are in the opening command state the brake control unit performs a first mutual diagnosis based on the hydraulic pressures detected by the hydraulic pressure detecting units, an operation quantity detected by the operation quantity detecting unit, and a previously stored characteristic between the operation quantity and the hydraulic pressure detected by at least one of the hydraulic pressure detecting units which are continuously variable, and performs a second mutual diagnosis based on the hydraulic pressures detected by the hydraulic pressure detecting units, when the cutoff valves are in the closing command state the brake control unit performs the first and second mutual diagnoses, and
the brake control unit detects failure in the cutoff valves and the hydraulic pressure detecting units based on of results of the first and second mutual diagnoses in the closing command state and the opening command state of the cutoff valves.

2. The braking device as claimed in claim 1, wherein when a result of either of the first and second mutual diagnoses in the opening command state and the closing command state of the cutoff valve in one of the systems is abnormal and the result of the other of the first and second mutual diagnoses is normal, the brake control unit detects that the cutoff valve has failed and performs general braking force adjusting control of the wheel cylinders with the hydraulic pressure source.

3. The braking device as claimed in claim 1, wherein the brake control unit detects which one of a plurality of the systems to which a failed one of the cutoff valves and the hydraulic pressure detecting unit belongs, based on the first and second mutual diagnoses in the opening command state and the closing command state.

4. The braking device as claimed in claim 2, wherein the brake control unit detects which one of a plurality of the systems to which a failed one of the cutoff valves and the hydraulic pressure detecting unit belongs, based on the first and second mutual diagnoses in the opening command state and the closing command state.

5. The braking device as claimed in claim 1, further comprising a braking force allocating unit for controlling allocation of a braking force to a regeneration braking by a motor capable of driving a first axle and braking of the first axle by the hydraulic pressure source, wherein:
the plurality of the systems of hydraulic passages comprise a first hydraulic system for braking the first axle and a second hydraulic system for braking a second axle, and
the braking force allocating unit maintains a braking force allocation ratio, which is a ratio of braking by the hydraulic pressure source to the regeneration braking, at a normal ratio when a failure is detected in the cutoff valve and the hydraulic pressure detecting unit of the second hydraulic system.

6. The braking device as claimed in claim 1, further comprising a braking force allocating unit for controlling allocation of a braking force to a regeneration braking by a motor capable of driving a first axle and braking of the first axle by the hydraulic pressure source, wherein:
the plurality of the systems of hydraulic passages comprise a first hydraulic system for braking the first axle and a second hydraulic system for braking a second axle, and
the braking force allocating unit increases a braking force allocation ratio, which is a ratio of braking by the hydraulic pressure source to the regeneration braking when a failure is detected in the cutoff valve and the hydraulic pressure detecting unit of the first hydraulic system.

7. The braking device as claimed in claim 1, further comprising a braking force allocating unit for controlling allocation of a braking force to a regeneration braking by a motor capable of driving a first axle and braking of the first axle by the hydraulic pressure source, wherein:
the plurality of the systems of hydraulic passages comprise a first hydraulic system for braking the first axle and a second hydraulic system for braking a second axle, and
allocation control of the braking force by the braking force allocation unit is inhibited and the regeneration braking is stopped, when failure is detected in the cutoff valve and the hydraulic pressure detecting unit of the first hydraulic pressure system.

8. The braking device as claimed in claim 1, further comprising a first alarming unit for outputting a first alarm when a failure is detected in the cutoff valve and a second alarming unit for outputting a second alarm when a failure is detected in the hydraulic pressure detecting unit, the second alarm is distinguishable from the first alarm by the operator.

9. A braking method for a braking device which includes a tandem type master cylinder including a plurality of hydraulic chambers which generate hydraulic fluid pressures by an operation of a brake pedal by an operator; an operation quantity detecting unit for detecting an operation quantity of the brake pedal; a plurality of systems of hydraulic passages for connection between the tandem type of master cylinder and a plurality of wheel cylinders; a hydraulic pressure source, installed in the hydraulic passages and being capable of pressurizing a hydraulic fluid in the hydraulic passages, based on the operation quantity detected by the operation quantity detecting unit; cutoff valves installed in the systems of hydraulic passages, respectively, between the master cylinder and the hydraulic pressure source, the cutoff valves opening in an opening command state thereof and closing in a closing command state thereof; and a plurality of hydraulic pressure detecting units for respectively detecting hydraulic fluid pressures of the hydraulic passages on a side of the wheel cylinders with respect to the cutoff valves, the braking method comprising the steps of:
when the cutoff valves are in the opening command state thereof, performing a first mutual diagnosis based on the hydraulic pressures detected by the hydraulic pressure detecting units, an operation quantity detected by the operation quantity detecting unit, and a previously stored characteristic between the operation quantity and the hydraulic pressure detected by at least one of the hydraulic pressure detecting units which are continuously variable, and performing a second mutual diagnosis based on the hydraulic pressures detected by the hydraulic pressure detecting units;
when the cutoff valves are in the closing command state thereof, performing the first and second mutual diagnoses; and
detecting for failure in the cutoff valves and the hydraulic pressure detecting units based on results of the first mutual diagnosis and the second mutual diagnosis in the opening command state and the closing command state of the cutoff valves.

10. The method as claimed in claim 9, wherein when a result of either of the first and second mutual diagnoses in the opening command state or the closing command state of the cutoff valve in one of the systems is abnormal and a result of the other of the first and second mutual diagnoses is normal, it is determined that the cutoff valve has failed, and a normal braking force adjusting control of the wheel cylinders by the hydraulic pressure source is performed.

11. The method as claimed in claim 9, wherein the braking device further includes a braking force allocating unit for controlling allocation of a braking force to regeneration braking by a motor capable of driving a first axle and braking of the first axle by the hydraulic pressure source, wherein:
the plurality of the systems of hydraulic passages comprise a first hydraulic system for braking the first axle and a second hydraulic system for braking a second axle, and
the braking force allocating unit is controlled to maintain a braking force allocation ratio, which is a ratio of braking by the hydraulic pressure source to the regeneration braking, at a normal ratio when a failure is detected in the cutoff valve and the hydraulic pressure detecting unit of the second hydraulic system.

12. The method as claimed in claim 9, wherein the braking device further includes a braking force allocating unit for controlling allocation of a braking force to regeneration braking by a motor capable of driving a first axle and braking of the first axle by the hydraulic pressure source, wherein:
the plurality of the systems of hydraulic passages comprise a first hydraulic system for braking the first axle and a second hydraulic system for braking a second axle, and
the braking force allocating unit is controlled to increase a braking force allocation ratio, which is a ratio of braking by the hydraulic pressure source to the regeneration braking when a failure is detected in the cutoff valve and the hydraulic pressure detecting unit of the first hydraulic system.

13. The method as claimed in claim 9, wherein the braking device further includes a braking force allocating unit for controlling allocation of a braking force to regeneration braking by a motor capable of driving a first axle and braking of the first axle by the hydraulic pressure source, wherein:

the plurality of the systems of hydraulic passages comprise a first hydraulic system for braking the first axle and a second hydraulic system for braking a second axle, and allocation control of the braking force by the braking force allocation unit is inhibited and the regeneration braking is stopped, when failure is detected in the cutoff valve and the hydraulic pressure detecting unit of the first hydraulic pressure system.

* * * * *